Patented Jan. 25, 1949

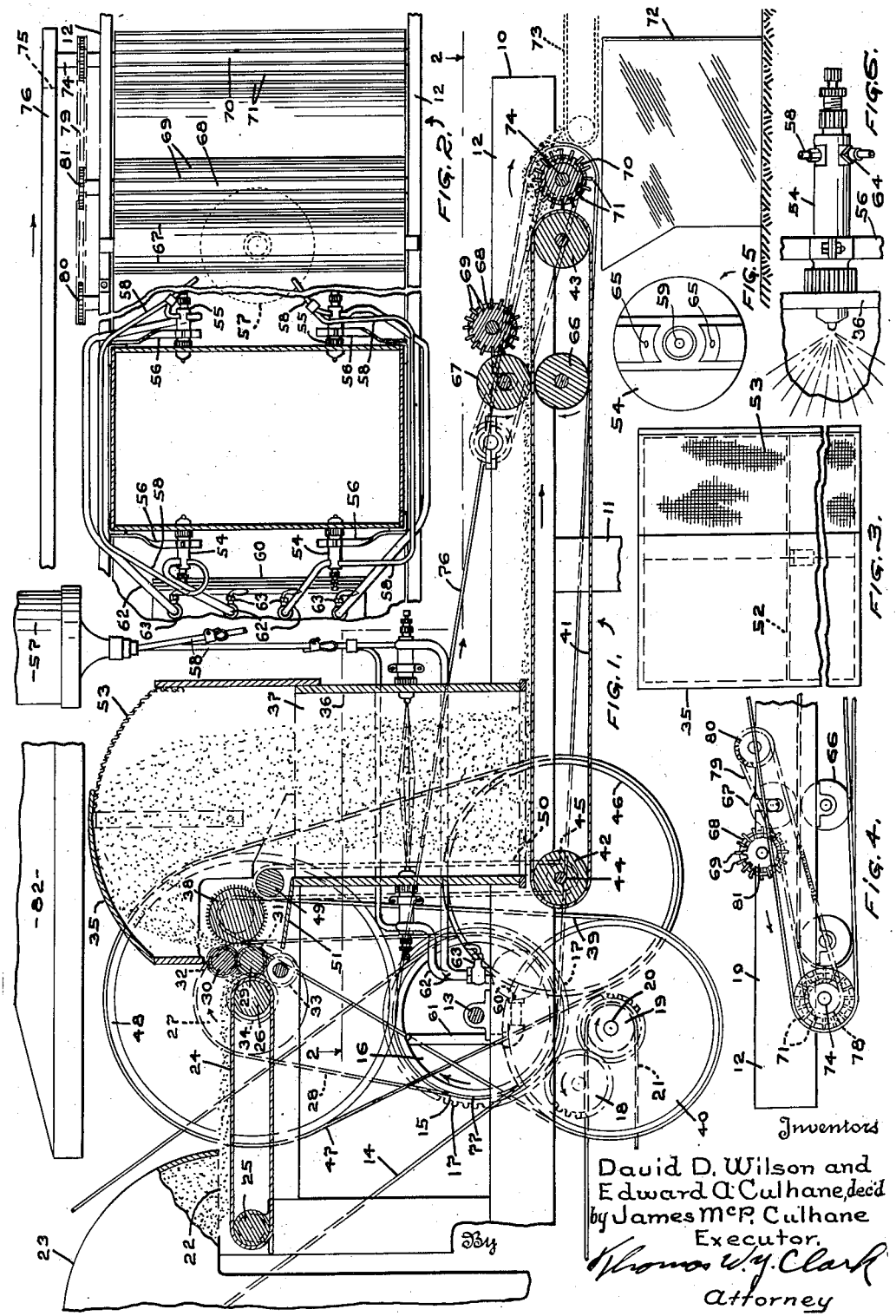

2,459,924

UNITED STATES PATENT OFFICE 2,459,924

MACHINE FOR CARROTING LOOSE FUR

Edward A. Culhane, deceased, late of Danbury, Conn., by James McP. Culhane, executor, Bridgeport, and David D. Wilson, Danbury, Conn., assignors to John B. Stetson Company, Philadelphia, Pa., a corporation of Pennsylvania Application June 29, 1945, Serial No. 602,366

2 Claims. (Cl. 68—5)

This invention relates to a means of treating loose fur or fur that has been removed from the skin and relates particularly to the carroting of loose fur.

An object of the invention is to provide a means to chemically treat loose fur whereby every fibre of the fur will receive uniform and thorough treatment.

A further object is to provide a machine which will treat or carrot cheap fur, which has heretofore been thrown away or used only for fertilizer, so that it will felt and can be used for such purposes as making hats.

Another object is to provide a fur carroting machine of relatively simple construction and which is capable of continuously carrying out the process and which is automatic in operation.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a view partly in side elevation and partly in section showing the improved machine;

Fig. 2 is a view partially in section and partially in plan, the view being taken substantially along the line 2—2 of Fig. 1 some of the various drives being omitted;

Fig. 3 is a top plan view of a hood employed;

Fig. 4 is an elevational view of a drive for a pair of cleaning rolls;

Fig. 5 is a front elevational view of an atomizer employed; and

Fig. 6 is a top plan view of the atomizer.

Referring in detail to the drawing, the machine as disclosed includes a frame 10 supported in any suitable manner as by uprights 11 and mounted on the rear portions of a pair of longitudinally extending frame bars 12 is a shaft 13. A belt 14 driven from a line shaft or motor (not shown) drives a pulley 15 on said shaft 13 and the shaft being thus driven serves to drive a pulley 16 and a gear 17 each secured to the shaft. Gear 17 drives an idler gear 18 meshing with a small gear 19 on a shaft 20 and such shaft also carries a pulley over which is trained a belt 21. Belt 21 through suitable means not shown operates to bring about the delivery of loose fur to a discharge opening 22 of a fur feeding means 23 of any or the usual construction.

The fur delivered by the feeding means 23 is deposited on an endless carrier 24 trained over a pair of rolls 25 and 26 and of which roll 26 carries or is driven by a pulley 27 over which, and the pulley 16, is trained an endless belt 28. Carrier 24 delivers the loose fur to a pair of feed rolls 29 and 30 and such rolls are geared together as by the gears 31 and 32, and gear 31 is driven by an idler 33 meshing with and driven by gear 34 operated by the roll 26. Feed rolls 29 and 30 are located in an entrance opening in one side of hood 35 which hood together with an enclosure 36 form a compartment 37 into the upper portion of which fur taken from the feed rolls is projected.

A picker roll 38 takes the fur from the feed rolls and from Fig. 1 it will be noted that this picker roll is of relatively large diameter, preferably about four and one-half inches in diameter, but different sizes may be used. Further, the picker roll is driven at a high speed, the speed of this roll being preferably in the neighborhood of 3,000 revolutions per minute. A belt 39 is trained over a relatively large diameter pulley 40 on the shaft 26 and such belt is also trained over a pulley, not shown, secured to rotate with the picker roll 38. Since the picker roll is of relatively large diameter and is driven at the high speed indicated, its surface speed or the speed of the pickers is high, and it operates to take the loose fur from the feed rolls, thoroughly separate the individual fibres, and throw them upwardly of the compartment 37 so that the fur fibres are individually delivered by the picker roll to the vertical central zone of the compartment separated from each other. Thus, the picker roll operating as described loosens the fur and separates the fibres from one another so that the fur floats downwardly or falls downwardly in the compartment practically with each of its fibres separated from the others.

Enclosure 36 is open at its lower end and operating beneath such end is an endless carrier 41 mounted as on rolls 42 and 43. Roll 42 is on a shaft 44 with a small pulley 45 and a large pulley 46 and such large pulley is driven as by a belt 47 trained over said large pulley and over a large pulley 48 on the shaft 34 above referred to. With this arrangement it will be understood that the carrier 41 will be constantly driven so that it is always moving beneath the lower end of the compartment 37 to carry away as soon as they rest on the carrier the fur fibres falling through such compartment. A roller 49 arranged slightly inwardly of and below the picker roll 38 is driven as by a belt 50 which belt is driven by the small pulley 45 above referred to, and this roll 49 serves to prevent fur fibres lodging on the shelf-like portion 51 of the enclosure forming the compartment 37.

To prevent cross currents of air the hood 35 is divided by a baffle 52 extending crosswise of the hood or at right angles to the picker roll, and in its upper side at a point remote from the picker roll the said hood is provided with an opening closed by a screen 53. The screen permits the air stream developed by the picker roll, to escape whereby the separated or individual fur fibres may fall or float downwardly without being carried in one direction or the other by air currents. From the above it is to be understood that the fur is not delivered to the compartment 37 in the form of knotted or matted masses but is delivered to the compartment in a thoroughly loose and separated condition so that it falls downwardly through the compartment in the form of separate fibres.

As the fur fibres float downwardly through the compartment 37 they are chemically treated as with a carroting liquid. This liquid is introduced into the compartment in a thoroughly atomized condition so that there are no droplets of the carroting liquid present in the compartment. For the purpose of introducing the carroting solution into the compartment pairs of atomizers 54 and 55 are arranged in the opposite walls of the enclosure 36, and these atomizers are so located that one of the atomizers 54 in opposite one atomizer 55 and the other atomizer 54 is opposite the other atomizer 55. It will be noted that with this arrangement the atomizers are located to project the thoroughly atomized liquid horizontally across the compartment 37 intermediate the ends thereof and that the atomizers of one side being opposite those of the other, the atomized liquid from one side of the compartment is projected against that from the other side thereof.

As shown the atomizers are of similar construction and the atomizers are supported as by straps 56 which straps may be carried around the ends of the compartments, and the carroting solution is supplied from any suitable container as from a tank or bottle 57 through tubes 58, and one such tube is connected to each atomizer to supply the solution thereto for discharge through a centrally located discharge opening 59. Air to atomize the liquid is taken from a tank or reservoir 60 to which it is supplied from any suitable source such as a compressor, not shown, through a conduit 61, and the air is supplied to the atomizers from the tank as through pipes or tubes 62 each of which adjacent the tank may be provided with a valve 63 for closing off the supply of air when the machine is not in operation. The pipes or tubes 62 at their delivery ends may be connected with the atomizers as through nipples 64 (see Fig. 6) and the air is discharged from the atomizers through relatively small openings 65 located one above and the other below the liquid discharge opening 59 whereby a relatively wide flat cloud of atomized liquid will result. Since the air is supplied to each atomizer from the reservoir 60 they will all be operated with the same pressure.

Attention is particularly directed to the fact that according to the present invention the carroting solution is introduced into the compartment in such thoroughly atomized condition that there are no droplets of the liquid to collect on and burn the fur fibres. The fur in a loose and separated condition being delivered to the vertical central portion of the compartment 37, and cross currents of air being prevented by the baffle 52 and the air stream generated by the picker 38 being permitted to escape through the screen 53, the fur fibres separate from one another are free to float downwardly through the compartment without being carried in one direction or the other by air currents. As these fur fibres pass downwardly through the compartment they must of course pass through a zone of atmosphere moistened by the thoroughly atomized carroting liquid and they will therefore each be thoroughly and uniformly treated with this atomized liquid. The atomizers being located opposite one another will have no tendency to throw the fur fibres against one side or the other of the compartment, and the fibres being separated as above pointed out each fibre is exposed on all sides to the thoroughly atomized carroting liquid suspended in the air.

On passing through the lower portion of the compartment the fur fibres fall onto the carrier 41 which, as above described, is constantly in operation and the fibres are carried away from the compartment. Toward the discharge end of the carrier 41 a roller 66 is arranged in supporting relation with the underside of the upper flight of the carrier and a roller 67 is loosely mounted at the upper side of said flight of the carrier, above the roller 66. Roller 67 is loosely mounted, that is free to move up and down in order that it may move toward and from the carrier, and neither roller 66 nor roller 67 are driven. Roller 67 serves to flatten the fur fibres on the carrier 41. A cleaner roll 68 is mounted adjacent the roller 67 and rotated in the same direction, and this roller 68 is provided with rubber strips 69 which serve to scrape off of the roller 67 any fur which may adhere to it. Roller 68 is driven in a manner later to be described.

A cleaner roll 70 is located at the discharge end of the carrier 41 and this roll 70 also is provided with rubber strips 71 corresponding with the strips 69 of roll 68, and roll 70 is so located that its strips 71 engage the carrier 41 as the latter passes over its roller 43 whereby to remove the fur fibres from the carrier. As these fibres are removed from the carrier they may be dropped into a receptacle 72 or they may be deposited on a carrier 73 for delivery at any suitable or desired point. Roll 70 is carried by a shaft 74 to which is secured a pulley 75 driven by a belt 76 trained over a pulley 77 also mounted on the shaft 13 above referred to. In this way the roll 70 is driven in a clockwise direction. Also, on the shaft 74 is a sprocket wheel 78 over which is trained a sprocket chain 79 operating over an idler 80. Chain 79 passes at the underside of and drives a sprocket 81 on the shaft of the cleaner roll 68 whereby said roll is driven in a counter-clockwise direction.

As a safeguard of the workman operating the machine a suction hood 82 is arranged above the entire machine to carry off fumes. Further, to withstand the attacks of the carroting solution or other liquid, the lower or rectangular portion of enclosure 36 of the compartment 37 may be formed of glass. This last is also desirable since it permits the operator to observe the effect the atomizers are having on the fur.

Since the fur fibres are separated from one another by the picker roll each individual fibre will be fully exposed to the action of the carroting solution and the fibres, will therefore be uniformly treated. It will also be clear that the action of the machine is continuous and it is again pointed out that the solution is introduced in such thoroughly atomized condition that there are no droplets of the solution. Should there be any droplets of the carroting liquid such droplets on coming in contact with the fibres will serve to burn them so that they will not properly felt. On the other hand, if the fibres were passed through compartment 37 in a matted condition the inner fibres would not be treated by the solution and would not felt.

With the present machine the fibres are continuously moved and are thoroughly and uniformly treated. They are not so wetted by the solution as to be burned but on the other hand are thoroughly and uniformly moistened just the right amount for proper treatment so that they will felt as desired. Since the fibres are continuously moved from the lower end of the compartment they have no opportunity to pack one on the other or to accumulate drops, however small, of the solution so that there is no danger of the fibres being burned. To prevent burning of the fur fibres by the solution it is necessary that the solution be so thoroughly atomized that no droplets are sprayed into the compartment, and in the appended claims where reference is made to the carroting solution being thoroughly atomized it is to be understood that such reference includes only such atomization as gives the desired result and it does not include any arrangement whereby the carroting solution is sprayed on the fur in the form of drops or droplets or in the form of a stream.

The picker roll and the atomizers introduce a large amount of air into the compartment or chamber 37. This gives a large volume of air in proportion to the amount of chemical. This with the thorough and intimate contact of the thoroughly atomized liquid with the fibre has a very beneficial effect and gives much better results than in any previously known method. With this machine we can use the carroting liquid heated which cannot be done with the ordinary methods as the fumes would kill the operators.

Various machines have been developed which purport to carrot loose fur or fur after it has been removed from the skin, but so far as we have been able to determine none of them have been satisfactory or practical.

Having thus set forth the nature of our invention, what we claim is:

1. In a machine for carroting loose fur, means providing a vertical compartment open at its lower end, means for delivering fur fibres in a loose and separated condition to the upper portion of said compartment to substantially cover the horizontal area thereof whereby said fibres in said condition may float downwardly through the compartment, means intermediate the ends of the compartment for projecting thoroughly atomized carroting liquid from opposite sides of the compartment, whereby atomized liquid from one side is projected against that from the other side horizontally across substantially the whole horizontal area of said compartment to provide a zone of atmosphere moistened with such liquid and through which said separated fibres fall, and continuously operating means carrying the treated fibres away from the lower end of the compartment.

2. In a machine for carroting loose fur, means providing a vertical compartment open at its lower end, means for delivering fur fibres in a loose and separated condition to the upper portion of said compartment to substantially cover the horizontal area thereof whereby said fibres in said condition may float downwardly through the compartment, means intermediate the ends of the compartment for projecting thoroughly atomized carroting liquid horizontally across substantially the whole horizontal area of said compartment from opposite points on the sides of the compartment whereby the atomized liquid from one side is projected against that from the other side, to provide a zone of atmosphere moistened with such liquid and through which said separated fibres fall, and continuously operating means carrying the treated fibres away from the lower end of the compartment.

JAMES McP. CULHANE,
*Executor of the Estate of Edward A. Culhane, Deceased.*

DAVID D. WILSON.

REFERENCES CITED

The following references are of record in the file of this patent:

UNITED STATES PATENTS

| Number | Name | Date |
|---|---|---|
| 339,352 | Tweedy | Apr. 6, 1886 |
| 1,085,391 | Tweedy | Jan. 27, 1914 |
| 1,106,371 | Donner | Aug. 11, 1914 |
| 1,574,618 | Gallagher | Feb. 23, 1926 |
| 1,598,429 | Fitch | Aug. 31, 1926 |
| 1,796,039 | Mijer | Mar. 10, 1931 |